United States Patent
Baum

[19]

[11] Patent Number: 6,141,889

[45] Date of Patent: Nov. 7, 2000

[54] FOOT SUPPORT AND METHOD (CIP VERSION)

[76] Inventor: Ira M. Baum, Foot Balance Sysetem, Inc. 8940 N. Kendall Dr. Suite 801 E., Miami, Fla. 33176

[21] Appl. No.: 08/960,333

[22] Filed: Nov. 3, 1997

Related U.S. Application Data

[63] Continuation-in-part of application No. 08/499,302, Jul. 7, 1995, abandoned.

[51] Int. Cl.[7] .................................. A61F 5/14; A43D 9/00

[52] U.S. Cl. ............................... 36/140; 36/43; 12/146 M

[58] Field of Search .................. 12/1 R, 1 G, 142 N, 12/146 M; 36/43, 44, 59 R, 59 C, 140

[56] References Cited

U.S. PATENT DOCUMENTS

| | | | |
|---|---|---|---|
| 4,120,102 | 10/1978 | Kenigson | 36/59 C |
| 4,268,980 | 5/1981 | Gudas | 36/43 |
| 4,378,643 | 4/1983 | Johnson | 36/59 C |
| 4,446,633 | 5/1984 | Scheinhaus et al. | 36/59 C |
| 4,745,290 | 5/1988 | Frankel et al. | |
| 4,876,758 | 10/1989 | Rolloff et al. | 12/142 N |
| 5,054,148 | 10/1991 | Grumbine | 12/142 N |

*Primary Examiner*—M. D. Patterson
*Attorney, Agent, or Firm*—Fish & Richardson P.C.

[57] ABSTRACT

A foot support is prepared based upon a scan of the foot. The foot support has radial ridges and grooves on its upper and lower sections. The ridges and grooves converge at an imaginary center outside the foot print. The surface contour of the support do not duplicate the topography of the foot, but perform prescription manipulations.

12 Claims, 5 Drawing Sheets

ND METHOD (CIP VERSION)

FOOT SUPPORT AND METHOD (CIP VERSION)

This application is a Continuation-in-Part of application Ser. No. 08/499,302, filed Jul. 7, 1995, now abandoned.

FIELD OF THE INVENTION

The present invention relates to a foot support, and more specifically that type which is directed to the shape of the patient's foot, and the shoe to be worn in order to give a prescription-like support for the foot while patient is engaged in a particular type of activity.

BACKGROUND OF THE INVENTION

The present state of the market place for custom arch supports is primarily physician, podiatrist, and chiropractor driven. Initially, an ink pressure plate foot imprint, or a negative cast is made from the patient's foot. The imprint or cast is then sent to an orthotic fabricating laboratory for fabrication. Fabrication is done through multiple time consuming and labor intensive processes that can be cost prohibitive. However, there are several companies that have developed computerized systems for fabricating orthotics, but these companies market primarily to physicians. The one company that is able to mill an orthotic, ADT, must take the negative cast that has been mailed to them by the doctor, and using a wand digitizer, digitize and then manipulate the image and then mill the device on a large mill that is housed in a warehouse.

The foot acts as a platform to support the human body. But the foot is more than just a flat board on which our body weight is supported. The foot is an intricate appendage that consists of twenty-six bones, as well as multiple joints, ligaments, muscles, nerves and vessels. The foot must be able to function in a smooth balanced systematic way, or it starts to become painful and deformities can develop. Additionally, the foot is a dynamic structure that changes as our weight is applied in a non-uniform fashion. As the body's center of gravity moves over the foot, the arch must lower and the foot becomes a flexible structure adapting to changes in the surface of the terrain upon which the feet are walking. Man has not always worn shoes and walked on paved surfaces, which may be contributing to the many foot problems modern man is suffering today. When the body weight is directly over the single supporting boot during a stride, the boot must change its function from a flexible structure to a rigid structure so that our body weight can move from the whole foot bearing the weight to only the ball of the foot and toe area, which is the area bearing the body weight as we push off to the next step.

In normal walking the foot acts as a complicated musculoskeletal appendage upon which may ground reactive forces act. For example, at heel strike the vertical forces peak, and forward shear, medial shear, and internal torque shear also occur. During the foot flat phase, vertical forces fore-aft shear, and internal-external shear decrease, while integral shear increases. During heel off, and the beginning of the propulsive phase of gait, vertical forces, aft shear, external shear, and medial shear increases to the forefoot area of the foot. Although this description is a simplified version of gait cycle, heal contact, foot flat, heel off and toe off, it is basically how the human foot functions. Abnormal function during the gait cycle helps to explain the many problems that over 40% of the human population that wear shoes experience.

The role of the arch support is to support the foot throughout the weight bearing part of the gait cycle and reduce abnormal stresses that can contribute to the ailments of the foot. Maximizing the functional control of the foot with the use of a foot support while reducing motion between the foot, the support and the shoe, will improve foot function, reduce the risk of developing deformity, and affectively slow down the progression of a deformity. Also, a support may help to prevent recurrence of deformity post-operatively. Additionally, there are may disease processes that can affect the foot leading to severe foot deformities, loss of or diminished sensation to the feet, as well as affecting other vital structures of the foot. For example, diabetes mellitus can cause a profound loss of the ability of a person to perceive pain. Subsequently the person may develop deformities of the foot medically termed Charcot Foot. The severely deformed foot will no longer have a bottom or plantar surface of the foot that resembles anything like a normal human foot. This deformed foot usually develops abnormal prominence on the plantar or weight bearing surface of the foot. These areas of abnormal prominence are areas of the foot that are subject to increased vertical and shearing forces and increased pressure. Increased localized pressure and the loss of the ability to feel pain have been implicated in the development of foot ulcers that can progress to infection, gangrene and loss of limb by amputation.

During many athletic activities the human foot has been determined to sustain an increase between 250–500% of the body weight. The increase in the forces going through the foot that is not functioning properly can damage the foot by causing acute injuries increasing the risk of developing deformities, and contributing to musculeskeletal problems of other areas though out the lower extremities and the lower back. By supporting the foot and aiding its function, many injuries associated with athletic activities can be reduced or prevented. Additionally, a foot support that can efficiently aid in foot function may not only prevent injuries to the foot or lower extremities, but may improve an individual's performance in the sport. In-most sports the human foot absorbs approximately 250–500% of the body weight, thus people who participate in sports will benefit from a properly designed foot support.

SUMMARY OF THE PRIOR ART

Illustrative of the prior art is Grumbine, U.S. Pat. No. 5,054,148 issued Oct. 8, 1991, which addresses a method of making an orthotic device in which parallel grooves are provide from the front to the rear of the foot engaging portion of the support. This procedure is outlined in greater detail in "Clinica in Podiatric Medicine and Surgery", Volume 10, No. 3, July 1993 commencing at Page 385: [Adjustments to the orthotics included simple changes to the orthoses' outer shell (the milled shell) . . . These outer-shell adjustments allow for the orthotic to fit into the shoe, seat the orthotic to prevent heel slippage or racking of the orthosis . . . . A shank correction was used when there was teetering of the orthosis. A teeter of the orthosis at the rear foot post was corrected by seating the anterior pitch of the rear foot post more flush on the shoe shank . . . . If the sulcus contour of the shank allows the orthosis to ride centrally, producing medial to lateral instability, the sulcus is deepened . . . . Additional corrections were used when needed to maximize control . . . . Orthotics were assessed to each metatarsal head for proper length. When the orthotic extends onto the first metatarsal; there is excessive pressure . . . metatarsal head irritation may occur. This necessitates either a shortening in the orthosis . . . sliding off may produce a medial fascial strain or pressure in the medial aspect of the heel . . . pressure in the arch or heel persists, shaving of the medial arch contour and lowering of its height is indicated. When there was heel slippage, the patient was asked it get higher counter to the shoe or to use a heel grip or narrow last to the heel of the patient's shoes.

The orthotics fabricated using the technique described by Grumbina have problems with fit, the seating of the bottom surface of the orthotic in the show, and the seating of the foot on the top surface of the orthotic, all of which are addressed by the present invention.

The potential for the need for additional corrections to maximize control may be avoided. The potential for irritation on the bottom of the foot due to excessive pressure are also addressed by the present invention. "The casting position was significant enough to influence patient tolerance." (Grumbine Patent No. 5,054,148.) Grumbine's method utilizes a negative impression of the foot submitted by the prescribing doctor and a wand to digitize the internal surface of the native. Because the operator must manually place the probe, the use of a digitizing wand technique for inputting the data introduces numerous opportunities for error.

A further problem with the Grumbine device and method is that by providing parallel grooves in the bottom of the support, it actually can enhance the possibility of the foot support slipping forwardly and rearwardly in the shoe during the action phase of the patient. The same is true of course, of the foot contact on the upper surface which is provided with identical parallel lines to the shoe contact portion. Hence, there is a twofold potential for slippage.

Prior to the CAD-CAM production of foot orthotics as described in the Grumbine patent, custom foot orthotics and custom foot supports were made by hand, one at a time. The steps included:

(1) Taking a negative plaster cast of the patient's foot. The effectiveness of the casting technique varied depending upon the person taking the plaster cast.

(2) Pouring of plaster of Paris into the negative cast to obtain a positive mold of the patient's foot.

(3) Subsequently stripping away the negative cast.

(4) Altering the negative cast through the addition and removal of plaster from the original plaster positive to compensate for tissue expansion and foot correction or prescription.

(5) Thermally applying hot material (mostly plastics) over the positive image to form a rough orthotic device, using an oven to heat the material until it was moldable, and a bladder press to conform the material to the positive image.

(6) Grinding the orthotic to a rough shape based on prescription information.

(7) Posting the forefoot (front area of the foot support) and rear foot (heel area of the foot support) to accomplish a defined angular relationship based on the prescription, foot, gait cycle, and activity.

(8) Final grinding or finishing the orthotic to make it presentable to the patient.

The above shortfalls noted in prior art are in part a function of the need to produce the custom foot support form a negative cast of the patient's foot. It is well known that the comfort and function of an orthotic device will depend upon the position of the patient's foot during casting. Often, the casting process results in the patient's foot being pushed, massaged or otherwise placed in an unnatural position, which ultimately results in an uncomfortable and sometimes intolerable foot support. Additionally, the use of a hand wand digitizer to digitize the internal surface of the negative cast also introduces error and subsequent discomforts. The internal surface of the plaster cast must consistently represent the bottom surface of the foot to be able to produce a consistently tolerable and functionally efficient foot support.

SUMMARY OF THE INVENTION

The product of the present invention is a foot support which has been prepared based upon a scan of the patient's foot, and to which ridges and grooves have been sculptured to the contour in a radial fashion resembling a Chinese fan pattern. The center of the radials of the Chinese fan is place within or outside the borders of the embodied of the foot support and located based on the patient's activity profile. Additionally, the material selected for the foot support as well as its thickness are a function of the patient profile. All of the parameters of the patient's profile and the foot support itself can be developed by a technician at a licensed and approved location using the scanner, computer program, and milling machine contemplated for usage by the present invention. In those instances where a prescribing physician is involved, manipulations prescribed based upon perceived abnormalities in the foot or fait or other aspects of the patient can be applied to the foot support as well. Depending upon the patient's activity and the particular foot type, the present invention utilizes radially spaced ridges and grooves that converge at imaginary centers outside the foot print. This is based on the fact that all activity involving the foot on the ground causes ground reactive forces that act on the foot. The ground reactive forces of gravity cause motion of the foot on the surface the foot comes in contact with. Slippage of the foot on the surface the foot is in contact contributes to less than optimum performance, increased energy consumption and increased potential for injury. Ground reactive forces affecting the foot are multiplanar. Particular activity has particular patterns and degree of ground reactive forces acting on the foot. Particular patterns and degrees of ground reactive forces of gravity cause particular patterns or motions to occur between the foot and the surface the foot is in contact with. Grooves and ridges reduce slippage by increasing surface contact of the surfaces. Convergent-divergent grooves and ridges reduce slippage and improve control of motion in multiple planes. Direction of convergent-divergent grooves and ridges on the surface of the foot support control motion more efficiently dependent on the pattern of ground reactive forces acting on the foot in a particular activity. This is not well known to those experienced in the art. The direction of the convergent-divergent groove and ridge pattern is automatically formatted in such a manner that the CNC mill will develop the specific direction of the convergent-divergent groove and ridge pattern on the top and bottom surface of the foot support. The point of convergence on each individual foot support is determined by the particular activity chosen by the individual. The point of origin of the convergent-divergent grooves and ridges is calculated by identifying the direction of the convergent-divergent grooves and ridges in relationship to the long and transverse axis of the digitized impression of the foot support. The point of convergence will be located either within or outside the embodiment of the foot support. The point of origin will fall either medial (toward the midline of the body), lateral (away from the midline of the body) or on the longitudinal bisection of the foot support. The point of origin will fall either anterior, on or posterior to the transverse bisection of the foot support. The direction of the convergent-divergent grooves and ridges determine the exact point of convergence. Extensions of a line (groove) perpendicular to the longitudinal bisection of the foot support extending to the opposite edge of the embodiment of the foot support from the direction of convergence initiates the development of the adjacent convergent grooves and ridges on the foot support. Adjacent convergent lines (grooves) are developed between one to four degree radial spacing, not to exceed 2.5 mm from the apex of a ridge and the apex of an adjacent ridge on the edge of the foot support. The depth of the groove will vary, but at 0.10 mm good results are achieved. The placement of the imaginary converging centers is based upon the activity profile of the patient, such as walking, jogging, skiing, racquet sports, high heels, court sports such as basketball, and golf. All of these are applied in the process of milling the foot support based upon tabularized predetermined dimensions and patient factors. The optical scan of the foot is taken normally in a partial weight bearing configuration such as sitting. The scanned portion of the foot is at least directed to cover the plantar (bottom) surface of the foot and extending at least one-third dorsally (up) the sides of the foot. The "manipulations" are modifications to the surface contour of the foot support which do no duplicate the topography of the foot, but rather perform more common prescription manipulations applied to foot supports.

The CAD program then produces a negative image of the modified or unmodified plantar surface of the foot extending approximately one-third of the way up (dorsally) the sides of the foot. The negative image is designated the top surface of the foot support. The image of the foot and/or the negative image of the plantar surface of the foot, as previously described, have the potential to be manipulated. A database containing predetermined parameters inter faces with the CAD program and controls the manipulations to either or both the image of the foot or the negative image of the plantar surface of the foot. The manipulations are modifications to the surface contour of the foot support which do not duplicate the topography of the foot.

The grooves on the top surface increase surface contact with the foot, and the grooves on the bottom surface increase surface contact with the inner lining of the shoe. The radially dimensioned grooves are substantially divergent-convergent grooves that reduce unwanted motion in multiple planes. The foot support is sculptured from a single block of material. The manufacturing of the foot supports contours and textures are completed in a single operation.

In view of the foregoing, it is a principal object to the present invention to develop a foot support for insertion into a shoe which is customized to the foot and the activity of the patient and to which the desired one or more manipulations has been applied.

Another object of the present invention is to develop a customized foot support which will minimize slippage tendencies associated with fore-aft and torque shear, as well as the lateral directions.

A further very important object of the present invention is to employ a three-dimensional scanner and translate the same into machine language for a surface contour machine which is relatively inexpensive, and which can mill customized foot support in a matter of hours, rather than days or weeks.

A corollary of all of the foregoing advantages and objects is to provide a relatively inexpensive technique for developing a customized foot support which can be operated by relatively unskilled people based upon modest training.

BRIEF DESCRIPTION OF THE ILLUSTRATIVE DRAWINGS

Further objects and advantages of the present invention will become apparent as the following description of an illustrative embodiment proceeds, taken in conjunction with the accompanying drawing, in which.

DESCRIPTION OF A PREFERRED EMBODIMENT

The process begins with an optical scanner 14 that can capture a three dimensional image of a body part. At this time the body part is the foot. The scanner has the ability to scan an non-weight bearing, partial weight bearing, or fully weight bearing foot. As previously described, the scanner develops the scan in an IGES format to be imported by the CAD program. The foot 15 or 16 is digitized into geometric entities such as NURB splines and surfaces. Additionally the scan is demonstrated on a screen and is ready to be printed on a color monitor. Ideally the technician should see the scan of the foot so that the foot is on the screen. Below the bottom contour of the foot separated by several spaces is the image of the foot support. The foot is visualized as grid for a shaded image of the scanned foot itself. The image is rotatable in all planes. For retail purposes the scanner is recessed into the floor. This way the customer 10 can stand for full weight bearing, be placed in a chair 11 for partial weight bearing, or have the foot suspended in the air for non-weight bearing scan. Additionally, the concept of a portable scanner is contemplated because scanning in a hospital, a trade show, or a doctor's office adds flexibility to the system. The captured images of the portable scanner are then be exported to a central system, directly or by modem, and a broader base of customers may have access to the system. A commercially acceptable scanner is that manufactured by 3-D Technology, Inc. and sold under the trademark FootDigitizer.

The Surfaces

Figures 4, 5, 6:
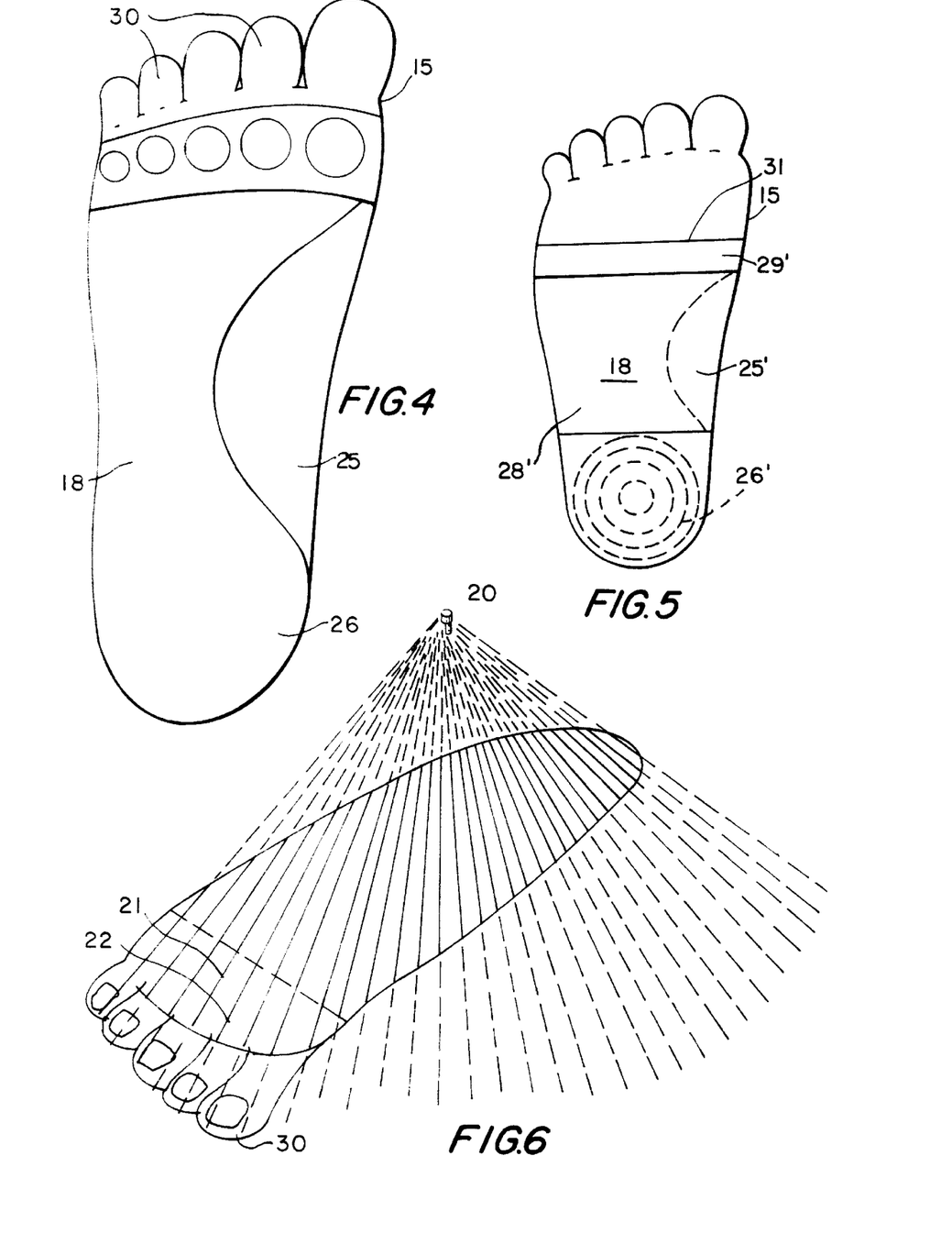
FIG. 4 is a bottom view of a normal right root identifying its various anatomical portions to which the foot support is applied.
FIG. 5 is a further bottom view of the right foot showing the typical foot support defining the topographical locations about the foot support, and the proportions of the length of the foot support starting at the posterior edge and ending at the anterior edge.
FIG. 6 is a top perspective view of a foot support for the right foot illustrating the ridges and grooves extended radially and converging at an imaginary center located outside the foot shadow to accommodate the exemplary forces associated with court sports.

The top surface of the support is the surface intimate with the bottom of the foot. The bottom surface of the support is the surface in contact with the floor or inside of the shoe. As shown in FIGS. 4 and 5, both the top and bottom surfaces are divided into four regions: heel, arch, lateral edge and forefoot. The system is able to manipulate each of these surfaces of the support both on the top and the bottom. The purpose of changing these surfaces is to customize the support so that it is comfortable and functionable while still fitting into a shoe. Changes made in any or all of the described regions of the support will affect adjacent surfaces. For example, lowering or raising the defined arch area will effect the adjacent heel, lateral edge, and forefoot area. The system will keep changes, within the region being manipulated as well as the adjacent regions, proportional so that each adjacent region has a smooth transition on to the adjacent quadrant. For example, on a weight bearing image when the arch is captured by the scanner at its lowest portion it may be desirable to manipulate and elevate or lower the arch area 1.0 mm. While the technician may raise or lower the arch in the designated arch surfaces both top and bottom, he also wants the arch surface, heel, lateral edge, and forefoot surfaces to remain proportional. The same ability to manipulate the designated arch area must be the same for the other three designated areas.

An example is in applying a heel post. This is a platform on the bottom surface of the designated heel area that may not only flatten the contour of the bottom surface of the heel of the foot support, but may actually be beveled or in a wedge shape configuration so that the bottom surface of the heel area is angled to the supporting surface (the floor). In such a manner, for example, the technician can apply a four degree wedge where the outside portion of the bottom heel surface is flush with the supporting surface (floor) and the inside portion of the bottom surfaces raised. For example, a 2 mm raise to the inside of the bottom surface of the heel will create a wedge surface that will tilt the heel towards the midline of the body. This type of manipulation is called rear foot posting and it is commonly used in prescription type orthotics (supports prescribed by physicians in order to change the way the foot functions).

The same type of posting is routinely done of the forefoot part of the foot support. This is called extrinsic posting, that is, posting that is added to the actual contour of the support. At the times extrinsic forefoot and/or rear foot post can add bulk to the support, causing problems with fit. To combat the bulk, intrinsic posting is done by either torquing the top and bottom heel surface with respect o the remainder of the foot support. Either torquing the bottom and top surface of the designated heel surface inward towards the midline of the body or outward away from the midline of the body results from such intrinsic posting. The same can be accomplished with the designated forefoot surfaces. The other manner in which intrinsic posting is accomplished is by manipulating the bottom surface of heel area in such a manner as to effectively tilt the bottom surface either towards the inside or outside of the foot. Intrinsic forefoot posting on the other hand is primarily done by torquing the forefoot region so that the bottom surface of the foot is tilted either to the inside or the outside. The lateral border is usually manipulated only to make the support narrower or wider. For example in a flexible arch support the designate arch area may be thinner than the heel area. This adds flexibility to the arch area and rigidity to the heel area.

The top edge of the arch support is chamfered so that the edge of the arch support do not dig into the person wearing the arch support's foot and cause irritation. The top surface may need special accommodations contoured into the top surface. For example, a metatarsal pad which looks like a pear shaped tapered elevation can be placed in the designated forefoot area in order to redistribute pressure off the ball of the person's foot.

There are numerous examples of foot wear that will need significant manipulations. For example, women's dress shoes need the heel width to be two-thirds of the forefoot width. A high heel shoe will need change in the arch, lateral edge, and heel areas. A sport arch support may need to be thinned in the arch area, and thickened in the heel area, and the milling configurations may need to be changed so as to produce a surface that is most efficient for the primary sport of the customer. For example tennis consists primarily of lateral push off of the foot. When pivoting, the surfaces are grooved in such a way as to have the ridges and grooves converging towards the forces most commonly applied to the bottom surface of the foot support and the shoe, and the top surface of the foot support, and the foot.

Material Block

Foot supports have rigidity and flexibility variables depending upon the customer's perceived foot type, e.g. rigid high arch foot or flexible low arch foot. An opportunity for the customers to fill in this information is placed in the database. Additionally activity type will affect the rigidity or flexibility of the support of the support fabricated. The foot support materials are primarily polypropylene which is a relatively hard plastic that has the capability of becoming more flexible as the foot support is milled thinner. Polypropylene is one material that is used often for arch supports and orthotics fabricated in the United States today. However, the importance of protecting the diabetic foot is apparent. Foot wounds in a diabetic an lead to gangrene and amputation. For many years many different soft and cushioning materials have been developed to protect the foot from pressures that could potentially cause a wound. Therefore, the mill of the present invention is purposely flexible enough to be able to mill not only a sem-rigid plastic, but a softer type of material as well. Additionally, where the bottom of the foot has a large bony protuberance too much pressure exits in that area of the foot. By imaging that foot and capturing the bony protuberance on the scan, the top surface of the foot support can be pocketed to accommodate bony protuberance, thus helping to prevent developing or reoccurring wounds.

Shaping the Block

The milling machine is preferably a bench top style. It must take into consideration noise and air pollution. Therefore the mill must be encased in an almost sound proof casing that is built in such manner that it will also protect any operator from having an accident, i.e., automatic shut off if the door opens with the milling machine engaged. The casing should be strong enough such that, if a piece of plastic or a bit shatters the shrapnel could not penetrate the casing. Additionally one of the main walls of the casing is made in see-through acrylic plastic so the customers can view the fabrication of the arch support. The mill should have an automatic bit changer, and safety features protect not only the operator, but the milling machine itself It should be easily serviceable. If a facility becomes very busy the CAD program should have the ability to run multiple mills at the same time. Exemplary of such a mill is light Machines Corporation of Manchester, N.H. Model No. 2000.

An additional manner of manufacture is gy a Stereo Lithography process which makes parts from thin layers of liquid photopolymer. A 3D surface or solid model of a part is first created with a CAD system and then a support structure is created and which is attached to the bottom of the CAD model Foot Support Shaping The foot support top and bottom are shaped based upon the scan and the shoe style, patient activity, size, weight, sex, and material chosen by the age of the customer in accordance with the following described Tables:

These tables are based upon the realization that automated modifications of a digitized image of the bottom surface of the foot can be structured based on an individual's responses to inquiries on sex, age, weight, foot type and shoe style. In addition, multiple manipulations based on the individual's activity determine the specific textured surface developed on the top and bottom surface of the foot support. With this being the case the tables contain values that specifically and automatically modify the digitized virtual image of the foot support according to specific defined values as determined by the sex, age, weight, shoe style, foot type and activity of the individual.

TABLE I

| | Material | | |
|---|---|---|---|
| Age/Sex | Polypropylene | EVA (ethylvinyl acetate) | Plastazote |
| Birth to 5 Years (infant) | −1.0 mm | −1.0 | N/A |
| 6 to 16 yrs. (F) 6 to 18 yrs. (M) | −0.5 mm | −0.5 mm | N/A |
| 17 (R) to 55 yrs | unchanged | unchanged | N/A |
| 19 (M) to 55 yrs. | unchanged | unchanged | N/A |
| Older 56 yrs. | −1.0 mm | −0.5 mm | N/A |

Age and sex are relevant in forming an effective foot support. A skeletally immature foot of an infant is composed of a significant amount of growth cartilage. Cartilage is more flexible than bone and therefore more easily contorted or deformed by the forces that are placed through them. As the individual matures the growth cartilage becomes bone, until skeletal maturity when all the bones of the foot are completely calcified. As the individual ages the bones lose elasticity and flexibility and become more rigid. Therefore, during skeletal immaturity, the foot support should be as rigid to support foot function, but also flexible to allow for growth and development. On the other hand, as the bones become more rigid the foot support should be flexible to account for the loss of elasticity in the bony structure, but rigid enough to still support the foot.

TABLE II

| Weight | Thickness of Material |
|---|---|
| Below 150 lbs. (M) Below 125 lbs (F) | Decrease by 0.01 mm per pound (F) |
| 150 lbs. (M) 125 lbs. (F) | Unchanged |
| Above 150 lbs. (M) Above 125 lbs. (F) | Increase by 0.01 mm per pound |

Body weight plays a role in determining the thickness of the foot support. With body weight greater than the average male or female the foot support is under greater force than the foot support of the average male or female. Therefore, the foot support needs to be reinforced by additional thickness to withstand the deforming forces of increased body weight. The exact opposite holds true for the individual weighing less than the average male or female. The foot support then is under less force and therefore needs less strength to prevent the deforming forces of the body weight.

TABLE III

| Foot Type | Arch Height |
|---|---|
| High Arch — Rigid | Reduce by 5.0 mm |
| Medium Arch — Supple | Unchanged |
| Low Arch — Flexible | Increased by 5.0 mm |
| Deformed Feet | Unchanged |

This table describes the arch height adjustment made to the foot scan of the consumer, depending upon the foot type identified. A low arch—flexible foot can tolerate the arch area of the foot support to be elevated in order to afford the arch more support. The medium arch—supple foot needs no adjustments to the height of the arch in order for the foot to function well. The high arch—rigid foot needs the arch to be lowered in order for the foot to reach its lowest point during weight bearing. By allowing the arch to lower to its maximum level, the foot maximizes it ability to absorb the vertical ground reactive forces optimally for the foot type. Additionally the person with the high arch foot will be better able to tolerate the foot support.

TABLE IV

| Foot Type | Normal Daily Activity | Athletic |
|---|---|---|
| High Arch (rigid foot) | Semiflexible (+) | Semiflexible (−) |
| Medium Arch (Supple) | Semirigid (−) | Semiflexible (+) |
| Low Arch (flexible) | Semirigid (+) | Semiflexible (+) |
| Deformed | Accommodative | |

Each foot type has an ability to adapt to vertical forces that occur with weight bearing. A rigid foot has very little motion available within the foot structure. This type of foot does not absorb the shock of the ground reactive forces well. Subsequently, the vertical ground reactive forces are transferred superiorly potentially causing injury to the ankle, legs, knees, hips and low back. Therefore, the rigid foot benefits from a more flexible material that will optimize the motions that occur within the foot and increase shock absorption. On the other hand, the flexible foot has an excessive amount of motion available within the foot structure. This type of foot has motion occurring in its joint structures when the foot should be a stable structure to lift the heel off the ground to transfer the body weight to the ball of the foot and toes for propulsion. Since the foot is excessively flexibility and not stable during propulsion, it acts as an inefficient lever for the muscles during gait. Additionally with motion occurring to a joint when it is not prepared to accept the forces can cause damage to the joints and subsequently can lead to deformities of the foot. The flexible foot benefits from a more rigid material to aid in reducing excessive motion occurring through the foot when the foot should be stable.

TABLE V

| Material | Quality and Thickness | | | | |
|---|---|---|---|---|---|
| | Semi-rigid (+) | Semi-rigid (−) | Semi-flexible (+) | Semi-flexible (−) | Accommodate |
| Polypropylene | 5.0 mm | | 4.0 mm | | 3.0 mm |
| E.V.A. | 5.0 mm | | 4.0 mm | | 3.0 mm |
| Plastazote | | | | | 12.0 mm. |

Once the quality of the material that suits the customer's foot type and activity level has been identified, the standard thickness of the material for that foot type and activity level is chosen. In the cases where tow materials of different standard thicknesses have the same quality, the customer will be given a choice of materials. Shoe styles may affect the choice of the material because for dress shoe, the less bulky the foot support, the better the fit.

TABLE VI

Heel Cup Depth

| Foot Type | Activity | |
|---|---|---|
| | Normal Daily Activity | Athletic |
| High Arch (rigid foot) | 10.0 mm | 12.0 mm |
| Medium Arch (supple foot) | 12.0 mm | 14.0 mm |
| Low Arch (flexible foot) | 14.0 mm | 16.0 mm |
| Deformed Feet | 16.0 mm | 16.0 mm |

Heel cup area of the foot support cradles the heel of the foot. The greater the motion that occurs to the heel of the foot during gait cycle, the deeper the heel cup that will be needed to effectively control it.

TABLE VII

| Shoe Style | Ball Width | Heel Width | Thickness of Material |
|---|---|---|---|
| Casual | unchanged | unchanged | unchanged |
| Athletic | unchanged | unchanged | unchanged |
| Dress—Men | −1.5 mm | −2.0 mm | −1.0 mm |
| Dress—Women | −1.5 mm | −2.5 mm | −1.0 mm |

Casual and athletic shoes are manufactured from lasts that tend to be wider, and with increased volume to give comfort and room to the foot that fits inside the shoe. On the other hand, dress shoes, although sensitive to fit, are also sensitive to appearance. The narrower more slender appearance of the shoe enhances the aesthetics of the shoe but at the cost of a comfortable fit. Therefore, dress shoes are built around lasts that have decreased widths and less volume available for the foot that fits inside the shoe. The foot support takes up space in the shoe. Therefore the shoe style does affect the amount of space available for the foot support. Foot supports that are to be used in dress shoes need to be less bulky and with decreased widths to fit in the shoe.

Taking into account all of the above, a typical profile of the patient identifies the show style, the material to be used, the type of foot, the activity, the age, sex, and the weight. Once this is correlated through the profile, the technician can preselect the shoe style and then cover the activity. As to shoe style, the primary difference is between dress and casual or athletic.

TABLE VIII

Figure 15:
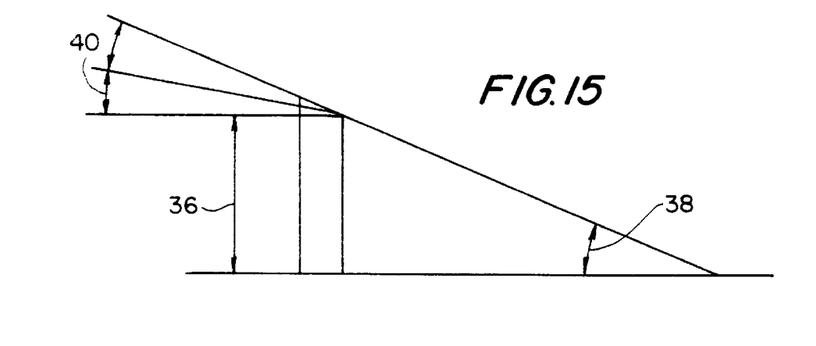
FIG. 15 is a diagrammatic view of the high heel shoe of FIG. 14.

| Heel Height | Heel Seat Angle | |
|---|---|---|
| <2" | 0 degrees | |
| 2" | 5 degrees | |
| 2⅓" | 10 degrees | |
| 3" | 15 degrees | Low | heel mens and womens shoes are built so that the foot inside the shoe sits on a relatively flat surface. Body weight is distributed throughout the foot evenly. The foot support in the shoe also sits squarely on the inner surface of the shoe. However, as the heel height increases, the body weight is disproportionately displaced forward towards the ball of the foot and the heel is raised up. A foot support that does not account for the increased inclination of the heel to the forefoot will teeter within the shoe during gate (see FIG. 15).

Shaping Pattern

Figures 1, 2, 3:
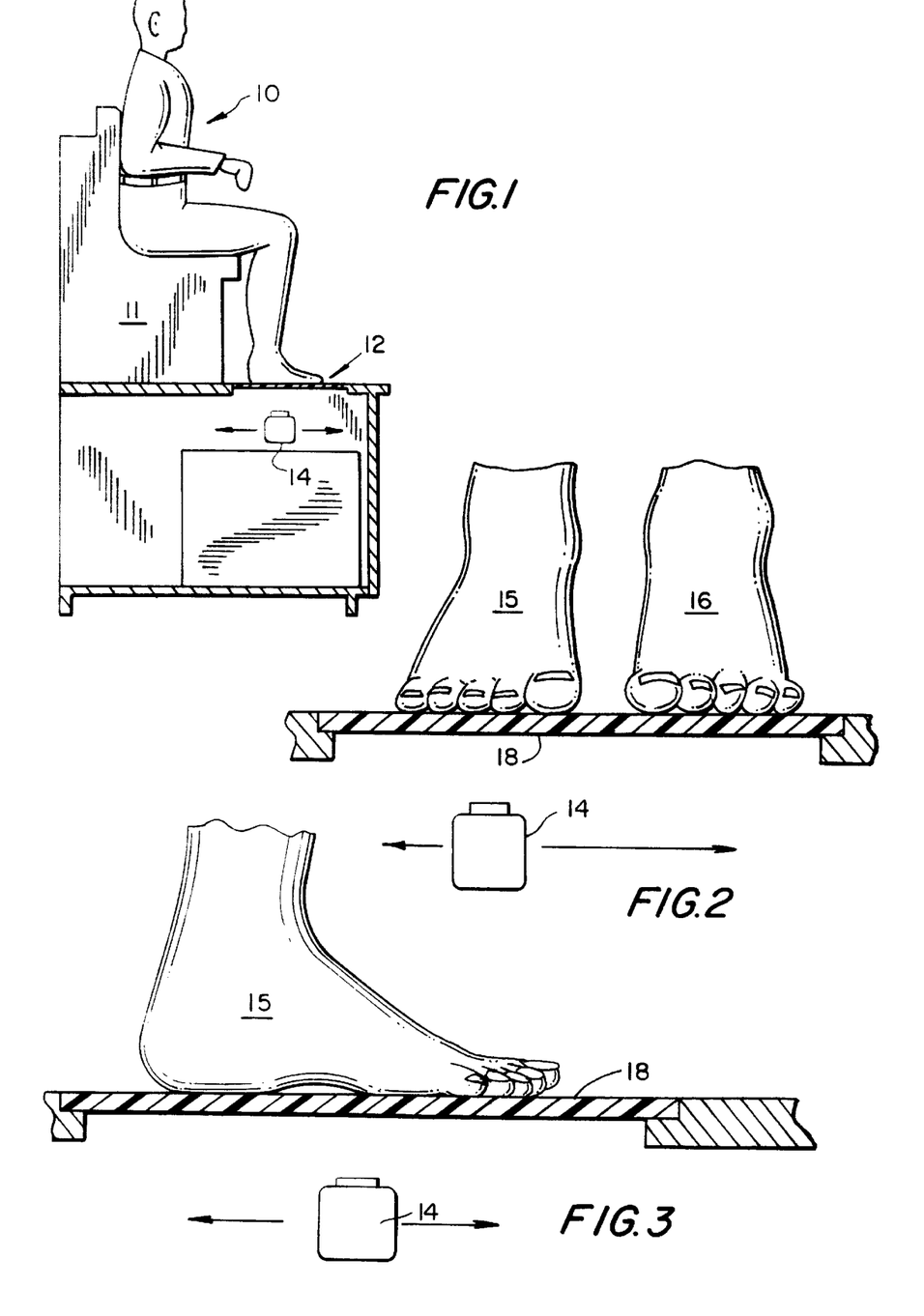
FIG. 1 is a side elevation of a patient sitting in a chair in a partial weight bearing mode on top of a scanner.
FIG. 2 is a front elevation of the lower portion of the patient's leg showing the scanning apparatus.
FIG. 3 is a side elevation showing the scanning activity of the scanner from front to rear.
Figure 3A:
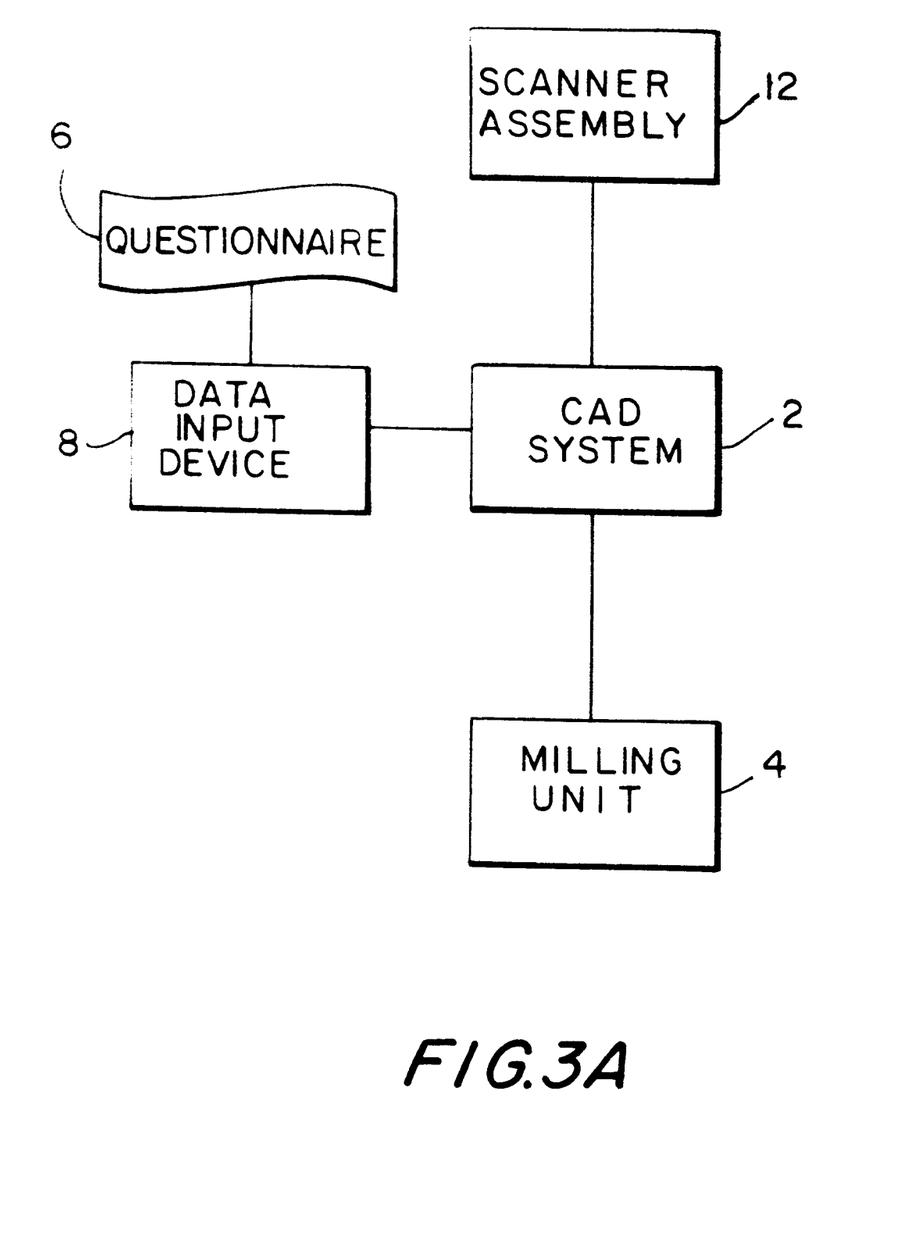
FIG. 3A is a block diagram of a foot support system according to the invention.

The shaping pattern is applied after the scan is made pursuant to FIGS. 1–3. There it will be seen that partial weight bearing occurs while the entire underneath portion of the foot is scanned.

Turning now to FIG. 4, which is a bottom view of the right foot, it will be seen that the foot portions are identified from rear to front as heel, lateral edge, arch and forefoot 15. Moving now to FIG. 5, which shows the bottom surface of the right foot support. This Figure demonstrates the geographic locations of the foot support 18. The anterior edge 31 is the edge of the foot support in the direction of the toes 30 of the foot. The posterior edge is the edge of the foot support is the direction of the heel of the foot. The medial edge is the edge of the foot support towards the midline of the body. The lateral edge is the edge of the foot support away from the midling of the body. The top surface is the surface of the foot support that is in contact with the foot. The bottom surface is the surface of the foot support that is in contact with the insole of the shoe. Additionally, FIG. 5 defines the foot support in percentages of length beginning at the posterior edge extending to the anterior edge. The anterior edge of the foot support terminates 1.0 cm posterior to the ball 29 of the foot.

The ridges and groves machined into the top and bottom surface of the foot support will be configured in such a manner as that of a "Chinese fan." The ridge and grooves radiate from a central point and diverge from that point spanning out over the top and bottom surface of the foot support. The central point from which the ridges and grooves radiate or converge, will be defined as the point of convergence.

It has been found that in order to maximize surface contact area of the top surface of the foot support with the foot and the bottom surface of the foot support with the insole of the shoe that the ridges and grooves are spaced on one to four degree radial spacings, not to exceed 2.5 mm from the apex of a ridge and the apex of an adjacent ridge, at the edge of the foot support. The depth of the groove will vary, but at 0.10 mm good results are achieved.

The grooving phase of the invention is illustrated in perspective in FIG. 6 which is a top view of the right foot 15 which is modified for court sports. There it will be seen that the ridges and grooves 21, 22 converge at an imaginary point of convergence 20 spaced medially of the heel of the right foot.

The location of the point of convergence 20 can be located anywhere within the embodiment of the foot support 18 or outside the embodiment of the foot support. Form the point of convergence the ridges and grooves fan out over the top and bottom surfaces of the foot support. Ridges and grooves 21, 22 placed converging towards the direction of the ground reactive forces occurring during motion, will resist motion. Therefore, slippage of the foot on the foot support, and the foot support on the insole of the shoe is reduced. On the other hand, ridges and grooves 21, 22 placed diverging in the direction of the ground reactive forces occurring during motion, will augment motion. Therefore, slippage tendencies of the foot on the foot support, and the foot support on the insole of the shoe will be increased. From the point of view of performance, a somewhat greater friction coefficient is desirable, since this would permit a more rapid response. Segesser, B and Pforringer, W. The Shoe in Sport. Year Book Medical Publishers, Inc., Chicago, Ill. 1989, page. 59

Different types of activities produce ground reactive forces to the foot that are relatively consistent with that activity. For example, during jogging, at heel contact with the ground, the foot continues to move forward and towards the midline of the body. In biomechanical terminology the foot pronates at heel contact. Excessive or prolonged pronation has been identified as a factor that contributes to injuries suffered by athletes participating in jogging. Therefore, the location of the point of convergence is different depending upon the primary activity anticipated for the use of the foot support. FIGS. 7–13 are examples of some common activities and the location of the point of convergence that will produce ridges and grooves that will enhance performance of the foot on the foot support, and the foot support on the insole of the shoe.

Figure 7:
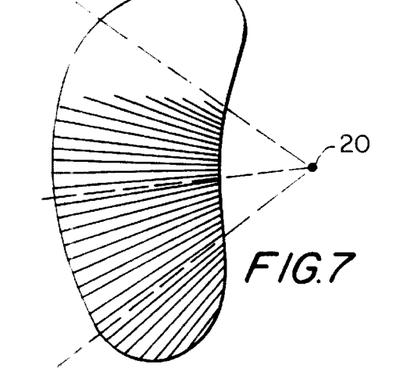
FIGS. 7, 8, 9, 10, 11, 12 and 13 inclusive are typical bottom view of the right foot illustrating in each the location of the ridges and grooves and the imaginary converging centers from which the ridges and groves are extended radially. The examples demonstrate the imaginary center being located outside the border of the foot support or within the borders of the foot support. The ridges and grooves are located to accommodate the various forces encountered by exemplary activity from normal walking through tennis, skiing, court sports, and the high heel configuration for ladies shoes.

Consistent with the invention and in logical fashion, we turn now to FIG. 7 which is the bottom view of the right foot 15 with the texturing of the surfaces of the foot support necessary for normal daily activities and walking. There it will be seen that the location of the point of convergence 20 is 50% of the length of the foot support from the posterior edge, and medial to the medial edge of the embodiment of the foot support. The ridges and grooves are fanning out in Chinese fan fashion throughout the entire foot length and terminating at the lateral border. The convergent ridges and grooves are at the bisection of the fore-aft, medial-lateral, and internal torque forces that occur during walking and normal daily activities. This configuration will reduce slippage and reduce excessive stress and strain on the foot.

Figure 8:
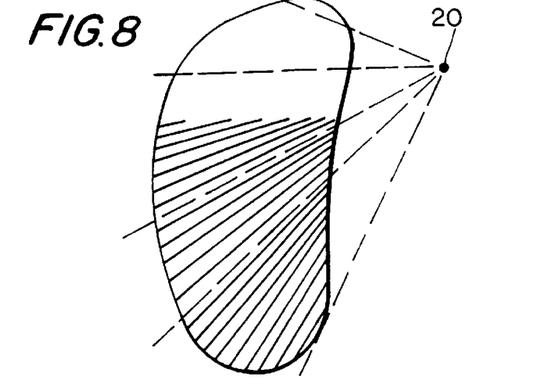

Transferring now to FIG. 8, the showing is of a jogger's foot which requires support on the medial edge and as a consequence the location of the imaginary point of convergence 20 of the grooves 21, 22 is selected as 75% of the length of the foot support from the heel to the forefoot portion, and positioned medially to the inside of the foot.

Figure 9:
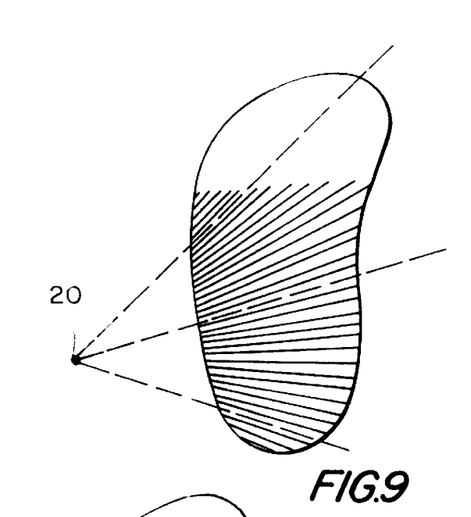

For a tennis player, as shown in FIG. 9 where the location of the imaginary center of point of convergence 20 is 25% of the length of the foot support from the posterior edge, and lateral to the lateral edge of the embodiment of the foot support 18. This permits the foot support 18 to enhance braking performance and lateral push off of the foot on the foot support, and the foot support on the insole of the shoe.

Figure 10:
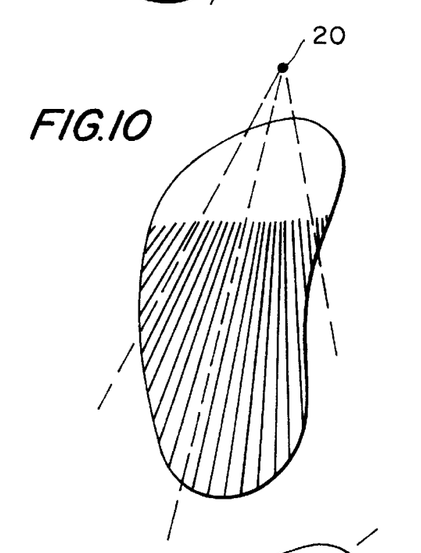

Translating now to FIG. 10, it is easy to imagine the ridges and grooves of the high heel with the imaginary point of convergence forward of the toes. In this fashion the effort of the foot or tendency to shift forwardly is impeded by the converging ridges and grooves 21, 22 located at a central distance forward of the foot.

Figure 11:
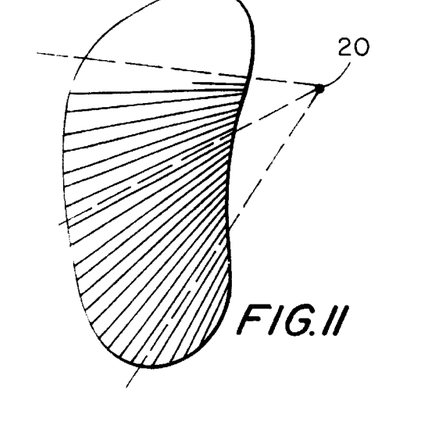

In FIG. 11 a configuration is shown which is desirable for Alpine skiing or hockey or speed skating. The point of convergence is toward the medial portion of the foot and forward towards the anterior edge of the foot support.

Figure 12:
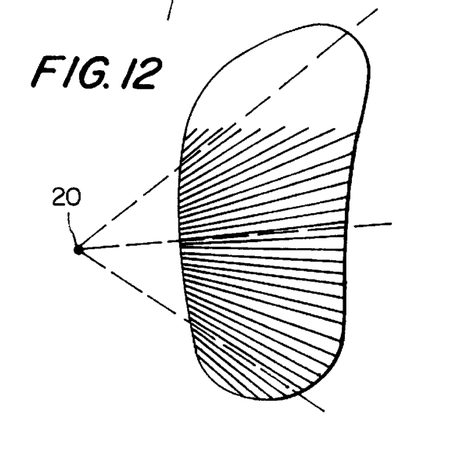

FIG. 12 demonstrates the various courts sports which might be the subject of engagement such as racquet ball, volley ball, badminton, and the like. In these types of activities lateral shear during pivoting is increased. By placing the location of the imaginary center of the point of convergence 20 50% of the length of the foot support from the posterior edge, and lateral to the lateral edge, lateral slippage can efficiently be controlled.

Figures 13, 14:
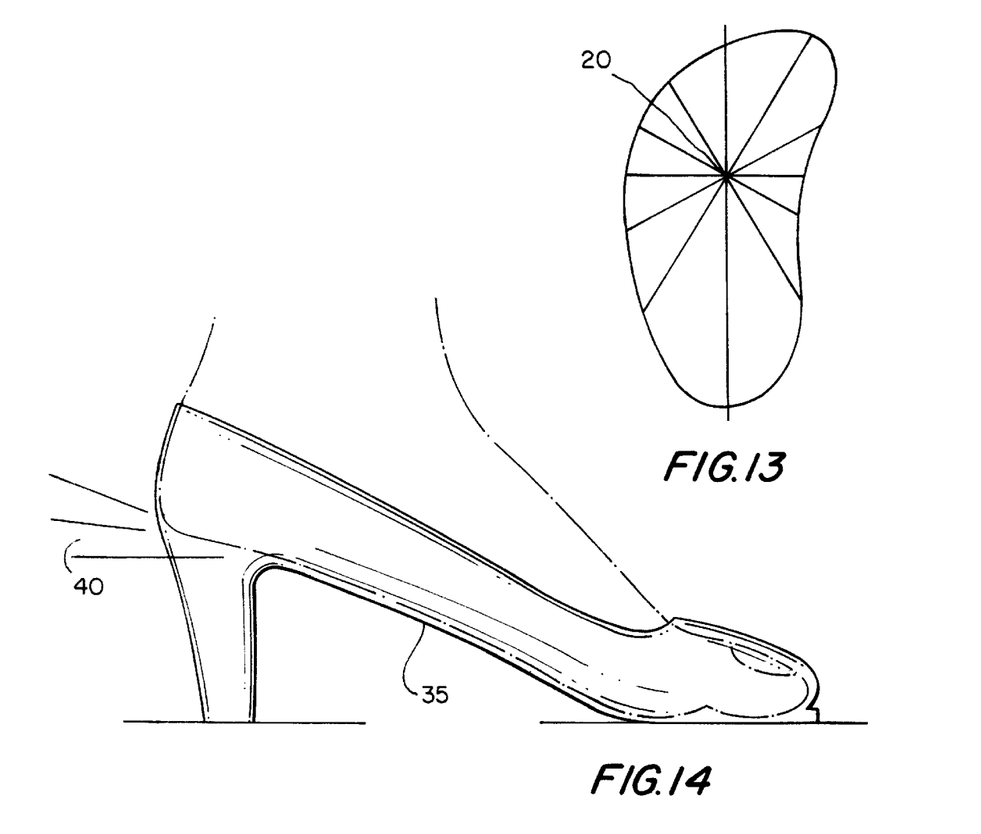
FIG. 14 is a semi-pictorial showing the tilt angle with a high heel shoe.

FIG. 13 depicts the movements common to golf, the ground reactive forces are primarily a series of lateral to medial weight shift and internal torque to the foot furthest form the green and medial to lateral weight shift and external torque to the foot closest to the green. To augment these weight shifts and torques, the location of the point of convergence is 75% of the length of the foot support from the posterior edge, and centrally within the embodiment of the foot support.

Summarizing as the orientation of the imaginary point of convergence 20, it should be noted that it is at times within the embodiment of the foot support and at times exterior to the embodiment of the foot support. It is positioned forwardly to prevent forward slippage, and rearwardly to prevent rearward slippage. Otherwise the imaginary center is to the medial or lateral side of the foot print depending upon the activity. Activity which requires rolling the foot onto the arch is that as illustrated for walking, jogging, Alpine skiing, hockey skating and speed skating. Lateral resistance is provided primarily for tennis, and court sports. The imaginary center is shifted forwardly or rearwardly depending upon the severity of the particular sport or activity. To be remembered, however, is that the initial evaluations and determinations made with the tables set forth above precede the overlay of the ridge and groove pattern as discussed primarily with FIGS. 7–13 above.

Note that in each of the Figures the placement of the center of converging ridges and grooves is demonstrated for a patient's right foot. Routinely a foot support is required for the both feet, the lines of divergence can be mirrored about an imaginary line that can be drawn between the patient's two feet. Thus, whereas the center of convergence for a right foot support for tennis is to the right of the right heel, the center of convergence for a left foot support would be to the left of the left heel.

Measuring and Forming

The measuring of the foot is done in accordance with the examples shown in FIGS. 1–3. The patient 10 sits in a chair 11. The scanner assembly 12 which is acceptable and commercially available is that manufactured by 3-D Technology, Inc. and sold under the trademark FootDigitizer. The moving scanner 14 in turn inputs its information into a CAD system 2, exemplary of which is a VisiCam manufactured by 3-D technology, Inc. Finally, the desk top miller or milling unit 4 is such as is available from Light Machines Corp. and known as Prolight 2000. The translation of the information from the foot scan to the CAD system and then to milling machine are those known in the art. This invention does not address those particular machines, but rather the category of measurement that is taken in order to develop the foot support which firstly utilizes the tables profile information of the patient, and then addresses the activity by positioning the artificial center for the radii which define the support for the activity anticipated by the patient.

The protocol for the manufacture of a custom foot support 18 illustrative of the present invention follows. The consumer fills out a questionnaire 6. Last name, first name, address, city, state, zip code. Next the consumer answers questions sex, age, weight. Foot type is then designated (high arch foot is considered a rigid foot type; medium arch foot is considered a supple foot type; low arch foot is considered a flexible foot type). The above definitions are to be considered examples of common arch heights associated with rigid, supple, and flexible feet. However, they are only examples and recommendations as to an individual's foot type, and may not be true of all feet. For example, it is possible to have a high arch foot when the foot is not bearing weight, but when that person stands up and puts weight on the foot, the arch flattens. In this case, the person should identify his foot as a "flexible foot type—low arch." In the other extreme example, a person may have a low arch when not bearing weight on the foot, and when that person bears weight his arch remains low and does not change with weight bearing. In this case the person should identify his foot a s a "rigid foot type—high arch." Therefore, the above recommendations as to arch height, and foot type is only a guide line and should only be thought of as such. Then questions are answered directed to primary activity they intend to participate in while using the foot support, primary shoe style they anticipate to use the foot support in, the type of material they would like the foot support to be made of (polypropylene, ethyl vinyl acetate (EVA), and plastazote). All three materials and the qualities of each of the materials will be illustrated to the consumer. Upon completing the questionnaire the operator inputs the data using a data input device 8 into a database, and creates a file for that customer. The customer is led to the scanner 14 and seated on the seat 11 and positioned with the hips flexed at 90", the knees flexed at 90", the ankles extended 90", and the foot flat on the scanner 18 (see FIG. 1). The foot 15, 16 is placed in a position such that the long axis of the knee cap bisects the long axis of the second toe. Upon satisfactory positioning of the person, the scan is taken. Upon completion of a satisfactory image input, the digitized foot is illustrated on a computer monitor. The embodiment of the foot support image is several spaces below the image of the foot. The data form the patient's file including sex, age, weight, foot type, primary activity, primary shoe style, and material chosen are the variables that define the manipulations to the final custom foot support via the CAD program. The CAD interfaces with the CAM program and the CNC tool paths interface with the mill. The chosen material is placed in the mill. The mill is then secured, and the customer foot support is then manufactured. In addition, the operator has the ability to manipulate preselected areas on the top and/or bottom surfaces of the foot support to fill an RX prescribed, by a professional, for a custom foot orthotic.

In the Examples which follow, a typical patient profile is suggested for both typical retail applications and applications that may be the result of manipulations suggested by a prescribing physician.

EXAMPLE I

The customer is a six year old female who is accompanied by her mother. The mother desires to have a pair of foot supports made for her daughter because her daughter complains of arch fatigue after playing.

| Sex: | Female |
|---|---|
| Age: | 6 years old |
| Weight: | 45 lbs. |
| Foot Type: | Flat foot—flexible |
| Activity: | Normal daily activities |
| Shoe Style: | Sneakers |
| Materials: | Polypropylene |

At the age of six years the female is skeletally immature. Her foot will tend to be more flexible since a portion of the bones of the feet are cartilage. Therefore, the foot support will need to be more flexible allowing for the foot to be supported and still allow for uninhibited growth. The thickness of the material is reduced 0.5 mm from the standard thickness giving the final support more flexibility. Refer to Table I. She weights 45 pounds which will have minimal deforming effect on the foot support when she bears weight. The thickness of the support will be reduced by 0.8 mm (see Table II). By reducing the thickness of the foot support 0.8 mm the foot support will maintain its ability to support the foot. Her foot type is described as a flat foot-flexible. The arch area will be raised 5.0 mm (Table III). This allows the foot support to contour the arch. Her daily activities are primarily "normal daily activities." The customer will need a semi-rigid+material (as shown in Table IV). The material that will be suitable for a semi-rigid+material is polypropyhlene 5.0 mm (see Table V). The heel cup depth is 14.0 mm (table VI). She will wear the foot support primarily in a sneaker (athletic shoe). Athletic shoes do not affect the ball width, heel width or thickness of the material (Table IV). The point of convergence will be 50% of the length of the foot support beginning at the posterior margin, and medial (towards the midline of the body) to the foot support (see FIG. 7). The convergent ridges and grooves will reduce medial-lateral, fore-aft, and internal torque shearing forces. These ground reactive forces occurring during walking will be efficiently controlled.

The final foot support will be made of polypropylene. It will be 3.7 m thick (5.0 m–1.3 mm). It will have convergent ridges and grooves medial and half way up the foot support with a 14.0 mm heel cup. The arch will be raised 5.0 mm. The top and bottom surface of the foot will extend from around the heel to 1.0 cm behind the ball of the foot.

EXAMPLE II

The customer is a nine year old boy who walks pigeon toed. He has been evaluated by a doctor who has prescribed a foot support that will change his gait and improve his foot function.

| Sex: | Male |
|---|---|
| Age: | 9 years old |
| Weight: | 125 pounds material |
| Shoe style | Casual |
| Foot Type: | Medium arch—supple |
| Activity: | Normal daily activity |
| Material: | Polypropylene |
| RX: | Intoe gait plate |

At the age of nine years the male is skeletally immature. His foot will tend to be more flexible since a portion of the bones of the feet are cartilage. Therefore, the foot support needs to be more flexible allowing for the foot to be supported and still allow for uninhibited growth. The thickness of the material is reduced 0.5 mm from the standard thickness giving the final support more flexibility (see Table I). He weighs 125 pounds which has minimal deforming affect on the foot support when he bears weight. The thickness of the support is reduced 0.25 mm (Table II). By reducing the thickness the foot support 0.25 mm the foot support maintains its ability to support the foot. His foot type is described as a medium arch-supple. The arch height is not adjusted (see Table III). This allows the foot support to maintain the contour of the arch without inhibiting the normal raising and lowering of the arch during function. His daily activities are primarily "normal daily activities." This customer will need a semi-rigid (−) material (see Table IV). The material that is suitable for semi-rigid(−) material is 4.0 mm polypropylene (see Table V). The heel cup depth is 12.0 mm (see Table VI). He will wear the foot support primarily in a casual shoe. Casual shoes do not affect the ball width, heel width or thickness of the material (see Table VII). The point of convergence for the ridges and grooves is 50% of the length of the foot support beginning at the posterior margin, and medial (towards the midline of the body) to the foot support (see FIG. 7). The convergent ridges and grooves reduce medial-lateral, fore-aft, and internal torque shearing forces. These ground reactive forces occurring during walking are thus efficiently addressed.

The final support is made of polypropylene. It is 3.25 mm thick (4.0 mm−0.75 mm). It has convergent ridges and grooves medial and half way up the foot support with a 12.0 mm heel cup. The arch height is not adjusted. The top and bottom surfaces of the foot support will be a mirror image of the bottom surface of the foot. The foot support extends from around the heel to 1.0 cm behind the ball of the foot. The anterior-lateral edge extends 3.0 cm anteriorly across the ball of the foot.

The following flow chart diagrammatically depicts the forming of the support of Example II.

EXAMPLE III

The client is an eleven year old boy. He has experienced pain in the back of his heels. He has been evaluated and given a prescription for a foot support that will elevate his heels and aid in foot function.

| | |
|---|---|
| Sex: | Male |
| Age: | 11 years old |
| Weight: | 105 pounds |
| Foot Type: | Medium arch—supple |
| Activity: | Athletic (basketball) |
| Shoe Style: | Athletic-sneaker |
| Material: | Polypropylene |
| RX: | 2 degrees extrinsic heel post. |

At the age of eleven years the male is skeletally immature. His foot will tend to be more flexible since a portion of the bones of the feet are cartilage. Therefore, the foot support needs to be more flexible allowing for the foot to be supported and still allow for uninhibited growth. The thickness of the material is reduced 0.5 mm from the standard thickness of the chosen material giving the final support more flexibility (see Table I). He weighs 105 pounds which will have a minimal deforming affect on the foot support when he bears weight. The thickness of the foot support is reduced 0.45 mm (Table II). By reducing the thickness of the foot support 0.45 mm the foot support will maintain its ability to support the foot. His foot type is described as medium arch-supple. The arch height does not need to be adjusted (see Table III). This allows the foot support to maintain the contour of the arch without inhibiting the normal raising and lowering of the arch during function. His primary activity for use of the foot support is playing basketball. The customer will need a semi-flexible (+) material (see Table IV). The material that is suitable is a semi-rigid (+) material such as 3.0 mm polypropylene or 4.0 mm EVA. The prescription call for polypropylene (see Table VI). The heel cup depth will be 14.0 mm (see Table V). He will wear the foot support primarily in a basketball sneaker. Athletic shoe styles do not affect the ball width, heel width, or thickness of the material (see Table VII). The point of convergence for the ridges and grooves is at 50% of the length of the foot support beginning at the posterior margin, and lateral (away from the midline of the body) to the lateral edge of the foot support (see FIG. 12). The convergent ridges and grooves reduce the medial to lateral shearing forces, commonly encountered during pivoting, the fore-aft forces, which commonly occur during quick starts and stops (braking). The most common ground reactive forces occurring during basketball will be efficiently controlled.

The foot support was prescribed by a physician. The RX instructed that a 2° extrinsic rear foot post be applied. An extrinsic rear foot post is a wedged platform placed on the bottom surface of the foot support. In this particular case a rear foot post has been specified, therefore, the wedge is built on the bottom surface of the heel quadrant. The wedge is made in such a manner that the medial (inside) portion of the rear foot wedge is higher than the lateral (outside) portion—the lateral border of the edge of the post should flush to the supporting surface. The elevation of the medial portion of the platform is elevated so that when the bottom surface of the foot support is on the supporting surface, the heel area will tilt the foot so that the bottom surface of the foot tilted toward the midline of the body.

The final support is made of polypropylene. It will be 2.05 mm thick (3.0 mm−0.95 mm). It will have convergent ridges and grooves lateral and half way up the length of the foot support. It will have a 14.0 mm heel cup. The arch height will not be adjusted. The top surface of the foot support will be a mirror image of the bottom surface of the foot. The bottom surface of the foot support will have a wedge platform on the heel quadrant. The foot support will extend from around the heel to 1.0 cm behind the ball of the foot.

EXAMPLE IV

A thirty-six year old female who has a bunion would like to have foot supports.

| | |
|---|---|
| Sex: | Female |
| Age: | 36 years old |
| Weight: | 145 pounds |
| Foot Type: | High arch |
| Activity: | Normal daily activities |
| Shoe Style: | Dress pumps (low heel) |
| Material: | E.V.A. |

The customer at thirty-six years old is skeletally mature. Therefore, the flexibility of the foot support will be unchanged. The thickness of the material is equal to the standard thickness of E.V.A. for a person with a high arch-rigid foot type (see Table I). She weighs 145 pounds which will cause a deforming force of the foot support when she bears weight. The thickness of the material is increased by 0.20 mm to increase the rigidity of the support to reduce the deforming of the foot support (see Table II). Her foot type is high arch-rigid. The arch area is reduced by 5.0 mm to allow the arch of her foot to lower and allow her increased flexibility to the foot (see Table III). Her daily activities are primarily "normal daily activities." This person thus needs a semi-flexible (+) material (Table IV). The materials that will be suitable for a semi-flexible (+) material are E.V.A. 4.0 mm and polypropylene 3.0 mm (see Table V). The customer is then informed of the choices of the materials. She is shown several samples of foot support made of the different materials. The final material for her foot support is her choice. In this example E.V.A. has been chosen. The heel cup depth is 10.0 mm deep (Table VI). The primary shoe style she desires to wear the foot support in is described as a dress pump (low heel). Womens dress shoes are made from narrow casts and therefore the ball width will be reduced by 1.5 mm, the heel width will be reduced by 2.5 mm and the thickness of the material will be reduced by 1.0 mm (see Table VIII). The point of convergence for normal daily activities is cross-referenced with a standard walking configuration. The center of the point of convergence is 50% of the length of the foot support beginning at the posterior margin, and medial (towards the midline of the body) to the foot support (see FIG. 10). The convergent ridges and grooves are oriented so that the medial-lateral, fore-aft and internal torque shearing forces control foot function during normal walking.

The final foot support is made of E.V.A. It will be 3.2 mm thick (4.0 mm+0.2 mm–1.0 mm). It has convergent ridges and grooves medial and half way up the foot support with a 10.0 mm heel cup. The arch height is reduced 5.0 mm to allow for the full excursion of the arch during the function. The top and bottom surfaces of the foot support will be mirror image of the bottom surface of the foot. The foot support will extend from around the heel to 1.0 cm behind the ball of the foot.

EXAMPLE V

A forty-two year old male presents a prescription for a foot support. Apparently the doctor has diagnosed the person as having a heel spur.

| | |
|---|---|
| Sex: | Male |
| Age: | 42 years old |
| Weight: | 170 pounds |
| Foot type: | Flat foot (flexible) |
| Activity: | Tennis |
| Shoe style: | Tennis shoe |
| Material: | Polypropylene |
| RX: | 3° intrinsic forefoot post, deep heel cup, polypropylene foot support |

At the age of forty-two years old the male is skeletally mature. The flexibility of the foot support is unchanged form the standard thickness of the chosen material. In this case, polypropylene has been ordered by his physician. The standard thickness of polypropylene for a person with a flat foot-flexible foot type (see Table I). He weights 170 pounds which will cause the material to deform due to this body weight. Therefore, the thickness of the foot support is increased by 0.20 mm to increase the rigidity of the foot support to reduce the deforming of the support due to his weight (See Table II). His foot type is flat foot-flexible foot. The arch area will be increased in height by 5.0 mm to allow his arch to contour to the foot support and give added support to the foot (Table III). His primary activity that he will use the support in will be tennis. The person will need a semi-rigid (–) material (Table IV). The material that suits the profile is semi-rigid (–) material is 4.0 mm polypropylene (see Table V). The heel cup depth has been prescribed as a deep heel cup. The recommended heel cup depth is 16.0 mm (see Table VI). 16.0 mm heel cup depth is considered a deep heel cup. He will wear the foot support primarily in tennis sneakers. Athletic shoes do not affect the ball width, heel width or the thickens of the foot support (see Table VII). The point of convergence for the ridges and grooves will be 25% of the length of the foot support beginning at the posterior margin, and lateral (away from the midline of the body) to the foot support (see FIG. 9). The convergent-divergent ridges and grooves reduce lateral slippage which occurs during pivoting. The ridges and grooves also enhance the push-off of the foot preparing to move towards the ball. The ground reactive forces occurring during tennis are efficiently addressed and movements during tennis are enhanced. The prescription calls for a 3° intrinsic forefoot varus post. This is accomplished by torquing the forefoot area of the foot support such that the inside border of the forefoot area is lower than the outside border. No additional material need be added to the bottom surface of the forefoot area.

The foot support is made from polypropylene. The foot support will be 3.8 mm thick (–0.2 mm). It will have convergent ones towards the heel and lateral to the foot support. The prescription requested a deep heel cup therefore a 16.0 mm heel cup was fabricated. The height of the arch of the foot support was increased by 5.0 mm. The top and bottom surfaces of the foot are mirror images of the bottom surface of the foot. However, the forefoot quadrant has been torqued so that the inside edge of the forefoot is lower than the outside edge of the foot support. The torque of the forefoot quadrant is such that a 3° of intrinsic forefoot tilt is accomplished. The foot support extends from around the heel to 1.0 cm behind the ball of the foot.

EXAMPLE VI

A diabetic person presents a prescription from her doctor for a soft foot support. The person has lost her ability to feel. She has a prominent bony swelling beneath the right foot. The doctor wants the for support to reduce pressure to the area in order to prevent the development of a sore on the foot.

| | |
|---|---|
| Sex: | Female |
| Age: | 62 years old |
| Weight: | 168 pounds |
| Foot type: | Flat foot — rigid |
| Activity: | Sedentary |
| Shoe Style: | Custom |
| Material: | Plastazote |
| RX: | Accommodative foot support with pocket to reduce pressure of the bony prominence beneath the right foot |

The patient is a sixty-two year old female. She is in an age group that would benefit from a more flexible support, the material, plastazote, is a soft, flexible material. The thickness of the material does not need to be altered (see Table I). She weights 168 pounds. The weight will deform the material. However, plastazote is a specially designed polymer that has, as one of its properties, the ability to deform and contour its surface to the bottom of the foot. The support will be increased in thickness by 0.43 mm. By increasing the thickness the flexibility of the foot support will not change, the life span of the foot support will increase (see Table II). The person has a low arch-rigid foot type. Usually a low arch foot type is associated with a flexible foot, however, in this case the person has a rigid foot. This is not uncommon with deformed and diseased feet. The arch height will not be adjusted due to the deformities (see Table III). The material prescribed is plastazote to accommodate the deformed foot (see Table IV). The thickness of the material is standard 12.0 mm (Table V). The heel cup depth is 16.0 mm (Table VI). This customer wears specially made customer molded shoes. The molded shoes are cross-referenced with casual shoes (see Table VII). The point of convergence is 50% of the length of the foot support beginning at the posterior margin, and medial (towards the midline of the body) to the foot support (see FIG. 7). The convergent ridges and grooves are oriented to that of a standard walking support. The person is sedentary and walking is her primary activity. The top surface of the foot support will have a pocket that corresponds to the abnormal bony prominence on the bottom surface of the foot, as prescribed.

The final support is made of plastazote. The support is 12.43 mm thick (12.0+0.43). It has convergent ridges and grooves medial and half way up the support to help control abnormal shearing forces. Shearing forces have been implicated as a contributor to the development of sores on the bottom of the foot. The top and bottom surfaces of the foot support are the mirror image of the bottom surface of the foot. The bony prominence of the bottom surface is accommodated and the localized pressure reduced. The foot support extends from behind the heel to the tip of the shoes.

EXAMPLE VII

A twenty-eight year old fashion conscious woman desires to have a pair of foot supports made that will fit her high heel shoes.

| | |
|---|---|
| Sex: | Female |
| Age: | 28 years old |
| Weight: | 120 pounds |
| Foot Type: | Medium arch—supple |
| Activity: | Non-athletic |
| Shoe Style: | 3" high heel dress shoe |
| Material: | Polypropylene |

The customer is a twenty-eight year old female. The flexibility of the foot support should be equal to the standard flexibility of the material of choice (see Table I). She weights 120 pounds. The thickness of the support is reduced 0.05 mm (see Table II). She has a medium arch-supple foot. The arch height does not need to be adjusted (see Table III). Her primary activities are non-athletic and she has medium arch-supple foot type. She will need a material that is semi-rigid (−) 4.0 mm polypropylene is a semi-rigid (−) material (refer to Tables IV and V, respectively). The heel cup depth is 12.0 mm (see Table VI). The primary shoe style wants to wear the foot supports in are dress 3Δ high heel 36 shoes 35. The width of the forefoot area of the foot support will be reduced by 1.5 mm. The heel width will be reduced by 2.5 mm. The thickness will be reduced by 1.0 mm (see Table VII). The heel seat angle 40 for a 3" high heel is 15°. The heel seat angle will allow the foot support to seat itself on the floor of the shoe without teetering back and forth (see Table VIII and FIG. 15). The center of the point of convergence is anterior and central to the forefoot area of the foot support (see FIG. 11).

The convergent ridges and grooves 21, 22 are placed in this position in order to help control the fore-aft shear force that occurs as the center of gravity of the body is shifted anterior lay in a high heel.

The final foot support is made of polypropylene. The foot support will be 2.95 mm (4.0 mm −1.05 mm) thick. The convergent ridges and grooves 21, 22 will be anterior to the forefoot edge in order to reduce fore slippage. The heel cup will be 12.0 mm deep. The arch height will not be adjusted. The top and bottom surface of the foot support will be a mirror image of the bottom surface of the foot. The foot support will extend around the heel 1.0 cm behind the ball of the foot.

It will be understood that various changes in the details, material and arrangements of parts which have been herein described and illustrated in order to explain the nature of the invention, may be made by those skilled in the art within the principle and scope of the invention as expressed in the appended claims.

What is claimed is:

1. An individualized foot support to minimize slippage, comprising:

a block of material having a top surface and a bottom surface; and     a plurality of non-parallel grooves and ridges in both the top and bottom surfaces;

wherein the material is contoured to fit the contours of the foot of the individual, and the grooves and ridges all converge at a common imaginary center point determined for the individual based on foot profile data of the individual.

2. A method for producing an individually contoured foot support to minimize slippage, comprising:

determining foot profile data for an individual;

scanning the individual's foot with a non-contact scanner to generate foot contour data;

determining an imaginary center point based on the foot profile data; and     sculpting a contour having a plurality of non-parallel ridges and grooves into a top surface and a plurality of non-parallel ridges and grooves into a bottom surface of a material, wherein the ridges and grooves diverge outwardly from the imaginary center point.

3. The method of claim 2, further comprising selecting the material for use in the foot support depending upon at least one of the following criteria: age, sex, weight, foot type, activity type, and shoe style.

4. The method of claim 2, further comprising selecting the thickness of the foot support depending upon at least one of the following criteria: age, sex, weight, foot type, activity type, and shoe style.

5. The method of claim 2, wherein the grooves and ridges reduce slippage of the foot in three planes of motion during activity by increasing the surface contact area.

6. The method of claim 2, wherein a pattern of convergent and divergent grooves and ridges emanating from the imaginary center point are oriented in relationship to the long and transverse axis of the foot support.

7. The method of claim 2, wherein scanning occurs when the individual is in a partial weight bearing configuration.

8. The method of claim 2, wherein scanning covers at least the plantar surface of the foot.

9. The method of claim 7, wherein scanning extends at least one-third dorsally up the sides of the foot.

10. The method of claim 2, wherein a computer-aided design program determines the imaginary center point using the foot profile data.

11. The method of claim 2, wherein the sculpting step includes milling the foot support at least partially based upon tabularized predetermined dimensions and factors.

12. A system for producing an individually contoured foot support to insert in a shoe, comprising:

- a non-contact scanner to generate three-dimensional foot contour data of an individual;
- a questionnaire for capturing foot profile data of the individual;
- an input device for entering the foot profile data into a database;
- a computer aided design system for processing the foot contour data and the foot profile data to generate foot support data that includes support length, width, arch height, heel cup depth, material and thickness, and for calculating an imaginary center data point; and
- a milling unit that uses the foot support data to mill a material to custom fit the individual's foot, and that sculpts a plurality of non-parallel ridges and grooves on a top and a bottom of the material that diverge outwardly from the imaginary center point.

* * * * *